US007085833B2

(12) United States Patent
Satagopan et al.

(10) Patent No.: US 7,085,833 B2
(45) Date of Patent: Aug. 1, 2006

(54) CACHING USER NETWORK ACCESS INFORMATION WITHIN A NETWORK

(75) Inventors: Murli D. Satagopan, Redmond, WA (US); Colin H. Brace, Seattle, WA (US); Mark R. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 09/764,956

(22) Filed: Jan. 17, 2001

(65) Prior Publication Data

US 2002/0095497 A1 Jul. 18, 2002

(51) Int. Cl.
*G06F 15/173* (2006.01)
(52) U.S. Cl. ........................ 709/225; 717/122; 717/126
(58) Field of Classification Search ................ 709/201, 709/203, 205, 218, 221, 249, 226, 245, 225; 707/201, 102; 711/138; 370/229; 713/153
See application file for complete search history.

(56) References Cited

U.S. PATENT DOCUMENTS

| | | | | |
|---|---|---|---|---|
| 5,867,667 A | * | 2/1999 | Butman et al. | 709/249 |
| 5,930,472 A | * | 7/1999 | Smith | 709/203 |
| 5,940,594 A | * | 8/1999 | Ali et al. | 709/203 |
| 5,978,813 A | * | 11/1999 | Foltz et al. | 707/201 |
| 6,311,205 B1 | * | 10/2001 | Dutcher et al. | 709/201 |
| 6,418,466 B1 | * | 7/2002 | Bertram et al. | 709/221 |
| 6,463,474 B1 | * | 10/2002 | Fuh et al. | 709/225 |
| 6,473,401 B1 | * | 10/2002 | Kong et al. | 370/229 |
| 6,505,241 B1 | * | 1/2003 | Pitts | 709/218 |
| 6,535,917 B1 | * | 3/2003 | Zamanzadeh et al. | 709/225 |
| 6,671,724 B1 | * | 12/2003 | Pandya et al. | 709/226 |
| 6,701,415 B1 | * | 3/2004 | Hendren, III | 711/138 |
| 6,769,031 B1 | * | 7/2004 | Bero | 709/245 |
| 2001/0044893 A1 | * | 11/2001 | Skemer | 713/153 |
| 2002/0138577 A1 | * | 9/2002 | Teng et al. | 709/205 |
| 2004/0215650 A1 | * | 10/2004 | Shaji et al. | 707/102 |

OTHER PUBLICATIONS

Shmueli et al., "DataSufficiency for Queries on Cache", Information Processing Letters, 1998, V65, N4, pp. 209-216.
Mann et al., "A Coherent Distributed File Cache with Directory Write-Behind", ACM Transactions on Computer Systems, 1994, V12, N2, pp. 123-164.
Gwertzman et al., "Autonomous Replication Across Wide-Area Internetworks", Operating Systems Review, Proceedings of the Fifteenth ACM Symposium on Operating Systems Principles, vol. 29, No. 5 Dec. 1995, p. 234.

(Continued)

*Primary Examiner*—John Follansbee
*Assistant Examiner*—Dustin Nguyen
(74) *Attorney, Agent, or Firm*—Lee & Hayes, PLLC

(57) ABSTRACT

A network system server, at a first network site, maintains network access information that identifies users authorized to access a network and a network controller, at a second network site, caches the network access information for individual users that request access to the network from the second network site. The network controller tracks the individual users that request access to the network from the second network site and updates the cached network access information for the individual users that request access to the network from the second network site within a defined time interval.

21 Claims, 6 Drawing Sheets

OTHER PUBLICATIONS

Bestavros, "Demand-Based Document Dissemination to Reduce Traffic and Balance Load in Distributed Information Systems", Proceedings Seventh IEEE Symposium on Parallel and Distributed Processing, Oct. 25-28, 1995, p. 338-45.

Gladney et al., "A Version Management Method for Distributed Information", Proceedings of the Third International Conference on Data Engineering, pp. 570-574.

H.M. Gladney et al., "A Version Management Method for Distributed Information", IEEE Catalog No. 87CH2407-5 pp. 570-574, Proceedings Third International Conference on Data Engineering (Feb. 1987).

A. Bestavros, "Demand-based Document Dissemination to Reduce Traffic and Balance Load in Distributed Information Systems", IEEE 1063-6374/95 pp. 338-345 (1995).

J. Gwertzman et al., "Autonomous Replication Across Wide-Area Internetworks", Proceedings of the Fifteenth ACM Symposium on Operating Systems Principles p. 234 (Dec. 1995).

T. Mann et al., "A Coherent Distributed File Cache With Directory Write-behind", Digital Equipment Corporation 103 pp. 1-44 (Jun. 1993).

O. Shmueli et al., "Data Sufficiency for Queries on Cache", Information Processing Letters Vol. 65, No. 4 pp. 209-216 (Feb. 1998).

* cited by examiner

CACHING USER NETWORK ACCESS INFORMATION WITHIN A NETWORK

TECHNICAL FIELD

This invention relates to a networked system and, in particular, to a networked system in which network access information maintained at a central location is distributed within the network.

BACKGROUND

In a network configuration, a global networked server can be implemented to maintain a directory of all universal group memberships within the network for each user authorized to access the network. A single directory of user network access information maintained at a central location augments access security of the network. An example of such a network configuration would be a company having a headquarters site and one or more remotely located branch sites. The server maintaining the directory of universal group memberships is implemented at the headquarters site. Domain controllers are network servers that administrate network access to clients and/or users at the remotely located branch sites.

The networked server is a global information server implemented as a repository of global information for the network. A network can encompass many domains where each domain is a unit of security. The global information server maintains information about all of the domains in the network and provides one central information store that can be queried by the domain controllers at the networked branch sites to locate and access network-wide information and resources.

A domain controller maintains information pertaining only to the domain or domains that it is authoritative for. A domain administrator can designate users and computers within a domain as security principals, and define groups of security principals within a domain. A network administrator can define universal groups having a membership of security principals that can be from many different domains. Groups of security principals can be granted access to network resources if the group memberships of a given user account are known.

A domain controller of a company branch office maintains user account information pertaining to the users that access the company network at the particular branch office. The complete set of universal group memberships for the branch office user accounts, and for all domains in the network, however, are only available at the global information server.

Each domain controller maintains a user object for each user authorized to access the network from within a particular domain. In the example of the company having remotely located branch sites, each branch site is distinguished as a separate domain. However, two or more branch sites can be encompassed in, and administrated as, a single domain.

A domain designates a replication partition and a security unit, and is not bound by physical or geographic constraints. Typically, the size of a domain is constrained by the number of users which represent a replication unit connected through a low bandwidth link. For a low bandwidth link, it is preferable to establish a small domain. Similarly, it would be disadvantageous to implement a global information server at a location constrained by low bandwidth links.

The global information server maintains the directory of all universal group memberships and replicates a copy of all the user objects from every domain within the network. The server associates, in the directory, each replicated user object with the universal group memberships that each user is authorized to access in the network.

When a user attempts to logon to the network at a remotely located branch site, the domain controller servicing the user's logon request at the particular branch site validates the user name and password with an associated user object maintained at the domain controller. The domain controller then evaluates the user's universal group membership status prior to allowing the logon request. The domain controller does so by sending a request to the global information server where the directory having the universal group memberships that the user is a member of is maintained.

If the global information server maintaining the directory is not available to service the request from the domain controller, or if the communication link between the domain controller and the server fails (is too slow, has an intermittent connection, is unreliable, etc.), the user's logon request is denied. This is to prevent a security breach of the network. Even though a user may have provided a correct username and password, the logon request fails because the universal group membership information is not available from the global information server directory.

In such a network configuration, the universal group membership information maintained in the global information server directory is required to be available to each domain controller of the network to allow user logon and access to the network. However, it is not practical and is cost prohibitive to implement a local server to maintain a global group memberships directory at each branch office site within the network due to limited hardware resources and available network bandwidth constraints.

SUMMARY

A network system architecture has a global information server that maintains a directory of network access information that identifies users authorized to access the network system. The network system makes the network access information available to one or more domains of the network system.

A network domain controller at a branch site of the network system caches the network access information so that the domain controller can validate a network access request from a user without having to establish contact with the global information server. The domain controller tracks individual users that request access to the network system from the domain controller and refreshes the network access information for these users.

The domain controller refreshes the network access information for the users that have previously accessed the network system within a defined time interval. This prevents the cached network access information from becoming unreliable, and compromising network security. Refreshing the network access information for users that have previously accessed the network system from the domain controller within a defined time interval ensures that the latest available network access information is used at the domain controller to validate a network access request.

BRIEF DESCRIPTION OF THE DRAWINGS

The same numbers are used throughout the drawings to reference like features and components.

DETAILED DESCRIPTION

The following technology describes systems and methods to provide user network access information to one or more remote branch sites of a network. The user network access information is periodically cached to a domain controller from a network global information server that maintains the information. The user access information is then available at a domain controller to validate a user network access request irrespective of whether the global information server that maintains the network access information is available to validate an access request when initiated by a user. Furthermore, the systems and methods apply to any types of information, resources, or data that is typically stored at a central location within a network.

Figure 1:
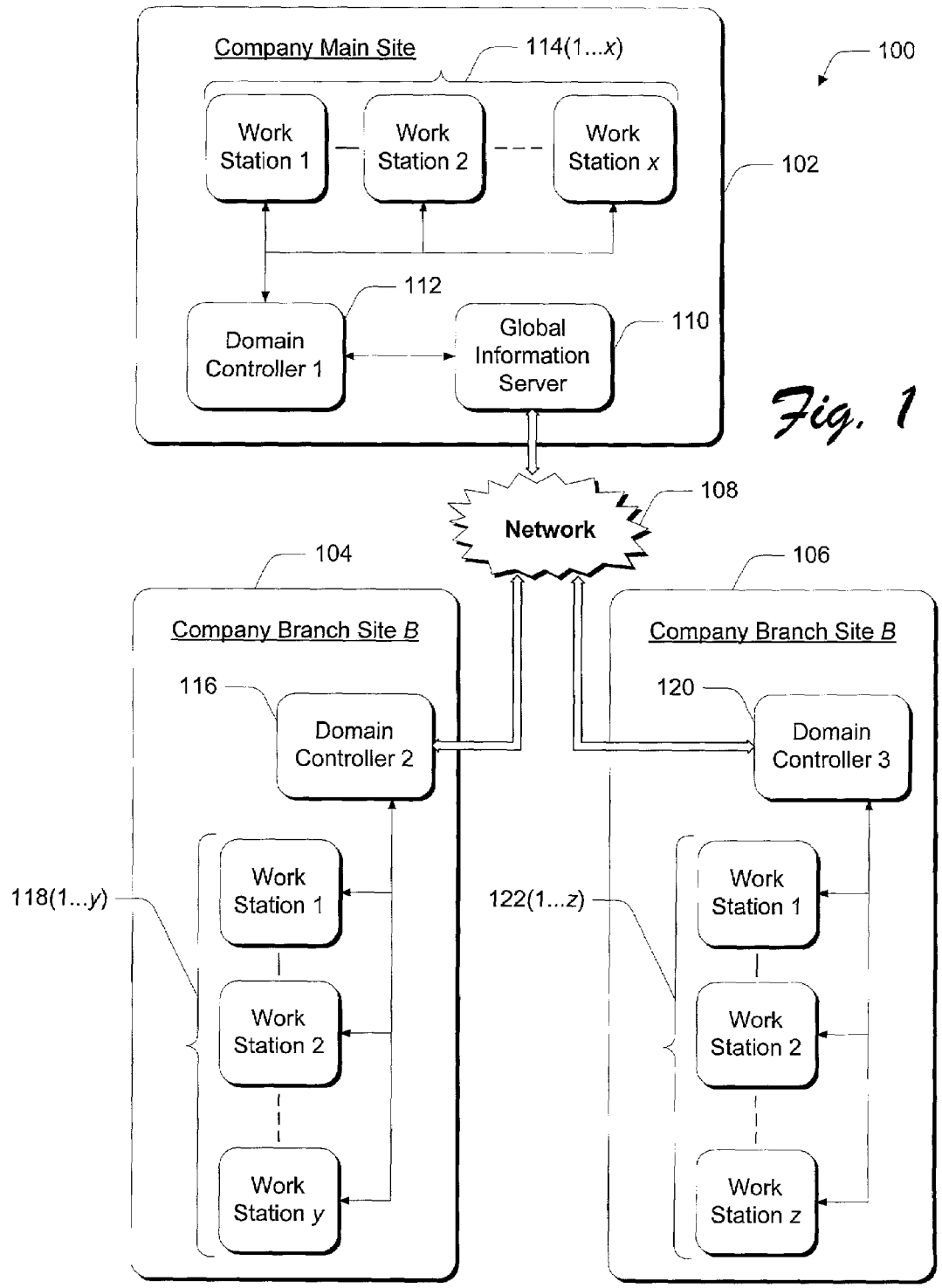
FIG. 1 is a block diagram of a network architecture.

FIG. 1 shows a network architecture 100 in which a company has a headquarters or main site 102 and two remotely located company branch sites 104, 106. Although the network architecture 100 is illustrated having only two branch sites 104, 106, the methods and systems described herein are applicable to a network having one, or any number of, remotely located branch sites. The main site 102 and the branch sites 104, 106 are interconnected via a communications network 108. See the description of "Exemplary Computing System and Environment" below for specific examples of the network architectures and systems, computing systems, and system components described herein.

A network global information server 110 is implemented at the company main site 102. The server 110 maintains network-wide information and is communicatively linked to the company branch sites 104, 106 via the communications network 108.

The main site 102 and the branch sites 104, 106 each implement a network branch site domain controller to locally administrate network access and functions. Main site 102 has a domain controller 112 connected to the global information server 110. The main site 102 also has any number of work stations 114(1 . . . x) connected to the domain controller 112. The work stations 114(1 . . . x) facilitate user, client, or account access to the global information server 110 through the local domain controller 112. A global information server can also be implemented as a domain controller for one or more domains. Although the following description pertains mainly to user requests to access a network, it is to be appreciated that any type of account, user, user account, client, and the like can be part of a network architecture and request network access and network information and resources.

The branch site 104 has a domain controller 116 connected to the global information server 110 via the communications network 108. The branch site 104 also has any number of work stations 118(1 . . . y) connected to the domain controller 116. The work stations 118(1 . . . y) facilitate user access to the global information server 110 through the local domain controller 116 (and via the communications network 108). Similarly, branch site 106 has a domain controller 120 connected to the global information server 110 via the system network 108. The branch site 106 has any number of work stations 122(1 . . . z) connected to the domain controller 120 to facilitate user access to the global information server 110 through the local domain controller 120 (and via the communications network 108).

Figure 2:
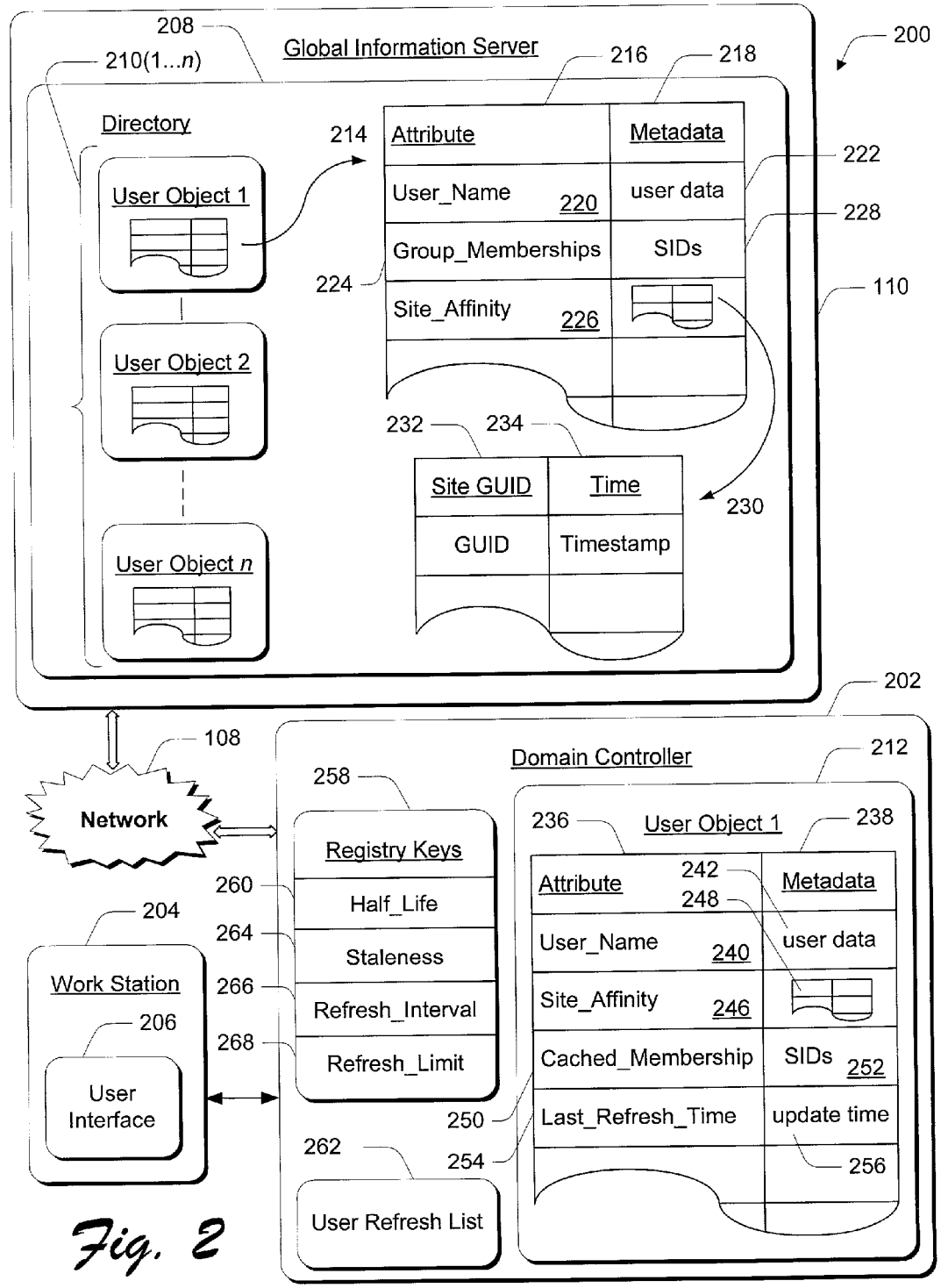
FIG. 2 is a block diagram that illustrates a configuration of data structures in the network architecture illustrated in FIG. 1.

FIG. 2 shows a configuration of data structures in a network architecture 200. The global information server 110 is connected to a network branch site domain controller 202 via the communications network 108. A user work station 204 is locally connected (i.e., not via the communications network 108) to the domain controller 202. The work station 204 supports a user interface 206 that facilitates user access to the network 200 via the local domain controller 202.

The global information server 110 maintains a partial copy of every domain in the network, where a domain is a replication partition boundary. The server 110 maintains universal group memberships for all of the domains in the network, and potentially, the group memberships can be stored across multiple domains.

Domain controller 202 maintains a total copy of the one or more domains for which it is authoritative. Global information server 110 maintains a directory 208 which is a copy of all the user objects 210(1 . . . n) from every domain within the network 200. The global information server directory 208 replicates a partial copy of the user objects from every domain in the network and associates each replicated user object 210(1 . . . n) with the universal group memberships that each user is authorized to access in the network 200. For example, domain controller 202 has a user object 1, identified as item 212, which is replicated in the directory 208 as the first user object 210(1) in the directory of user objects 210(1 . . . n).

A data structure 214 illustrates the replicated information that is stored by the user objects 210(1 . . . n) in the directory 208. The data structure 214 (i.e., a user object 210) has attributes 216 and metadata 218 associated with each attribute. An attribute User_Name 220 has user data 222 that associates a user of the network 200 with a user object 210. This attribute is replicated from the user objects maintained at the network domain controllers.

The data structure 214 also has an attribute Group_Memberships 224 and an attribute Site_Affinity 226. Group_Memberships 224 associates data that is a list of security identifiers (SIDs) 228 that denote the set of global and universal groups that a particular user object 210(1 . . . n) is a member of. The Group_Memberships attribute 224 is not replicated from the user objects maintained at the network domain controllers. Rather, the SIDs 228 identify the groups that a particular user is a member of and are associated with each replicated user object 210(1 . . . n) by the directory 208 to maintain network security. That is, the Group_Memberships 224 are user network access information that is centrally maintained by the global information server 110.

The Site_Affinity attribute 226 is multi-valued and associates data that is a data structure 230. Each Site_Affinity value has a globally unique identifier (GUID) 232 and a timestamp 234. Site_Affinity 226 conveys which networked branch site a particular user accesses the network 200 from. That is, the GUID 232 uniquely identifies the branch site that a user accesses the network 200 from and the timestamp 234 identifies the time at which the user requests access to the network 200. This attribute is replicated from the user objects maintained at the network domain controllers.

The domain controller 202, and each domain controller in a network, maintains a user object for each user authorized to access the network from a particular branch site. That is, for each user that accesses the network from a workstation connected to the domain controller 202, such as workstation 204, domain controller 202 maintains an associated user object for each user.

Domain controller 202 maintains the user object 212 that stores user network access information for a user that requests access to the network 200 via the domain controller. Similarly to the user object data structure 214 maintained by the network directory 208, user object 212 at domain controller 202 has attributes 236 and metadata 238 associated with each attribute. An attribute User_Name 240 has user data 242 that associates a user that requests access to the network 200 from a workstation connected to the domain controller 202. The User_Name attribute 240 is replicated as User_Name 220 which is maintained in the global information server directory 208 for each associated user object 210(1 . . . n).

The user object 212 also has a Site_Affinity attribute 246 that associates a multi-valued data structure 248. The Site_Affinity attribute 246, and the multi-valued data structure 248, are the replicated attribute 226 and data structure 230 maintained in the global information server directory 208. That is, the multi-valued data structure 230 is replicated from the data structure 248 maintained at domain controller 202.

The user object 212 has a Cached_Membership attribute 250 that associates SIDs 252 from the list of SIDs 228 maintained in the global information server directory 208 for each particular user object 210(1 . . . n). The domain controller 202 periodically caches the SIDs 228 from the global information server directory 208 and stores the user network access information at the user object 212 in the Cached_Membership attribute 250.

The user object 212 also has a Last_Refresh_Time attribute 254 that denotes an update time 256 which indicates when a given user's cached membership information (i.e., the Cached_Membership SIDs 252) was last updated, or refreshed. A periodic refresh of the user membership information is needed to guarantee an upper bound on how old the membership information is. For example, if a user does not request network access for an extended preset period of time, the user's membership information may be unreliable, or not the latest information available at the global information server 110. This presents the possibility of compromising network security because the user may no longer be authorized to access the network, yet the Cached_Membership SIDs 252 identify that the user can still access the network.

A network domain controller has a set of registry keys that can be set to control certain aspects of caching the user network access information. For example, domain controller 202 has a registry 258 containing registry keys that have default values, or the values can be changed, to control caching the SIDs 252 at the user object 212 from the global information server directory 208.

A Half_Life parameter 260 indicates one-half the maximum time for which a particular user's membership information (i.e., the Cached_Membership SIDs 252) will be automatically refreshed without having a logon network access request serviced by the domain controller 202. The network domain controller 202 maintains a user refresh list 262 of users whose membership information is periodically refreshed based on the last time that a user requested access to the network 200. A user is deleted from the user refresh list 262 if the user has not requested access to the network 200 via a domain controller for a period of time that equals 2×Half_Life. For example, the default value of the Half_Life interval can be set to three months. Thus, a particular user's membership information would not be refreshed if the user has not requested network access within a six month time period.

A Staleness parameter 264 indicates a maximum time after which the cached user group membership information (i.e., the Cached_Membership SIDs 252) will be considered "stale", or too old to be considered reliable with respect to network security. If the default value is one week, a user network access request will be failed if the cached membership information is older than this time period (and the global information server directory 208 is not available to service the network access request from a domain controller).

A Refresh_Interval parameter 266 indicates how frequently to update or refresh the Cached_Membership SIDs 252 from the global information server directory 208. For example, the default value to refresh the user group membership information can be set to eight hours. A Refresh_Limit parameter 268 controls the maximum number of users refreshed in every Refresh_Interval, which can be five-hundred users.

Figure 3:
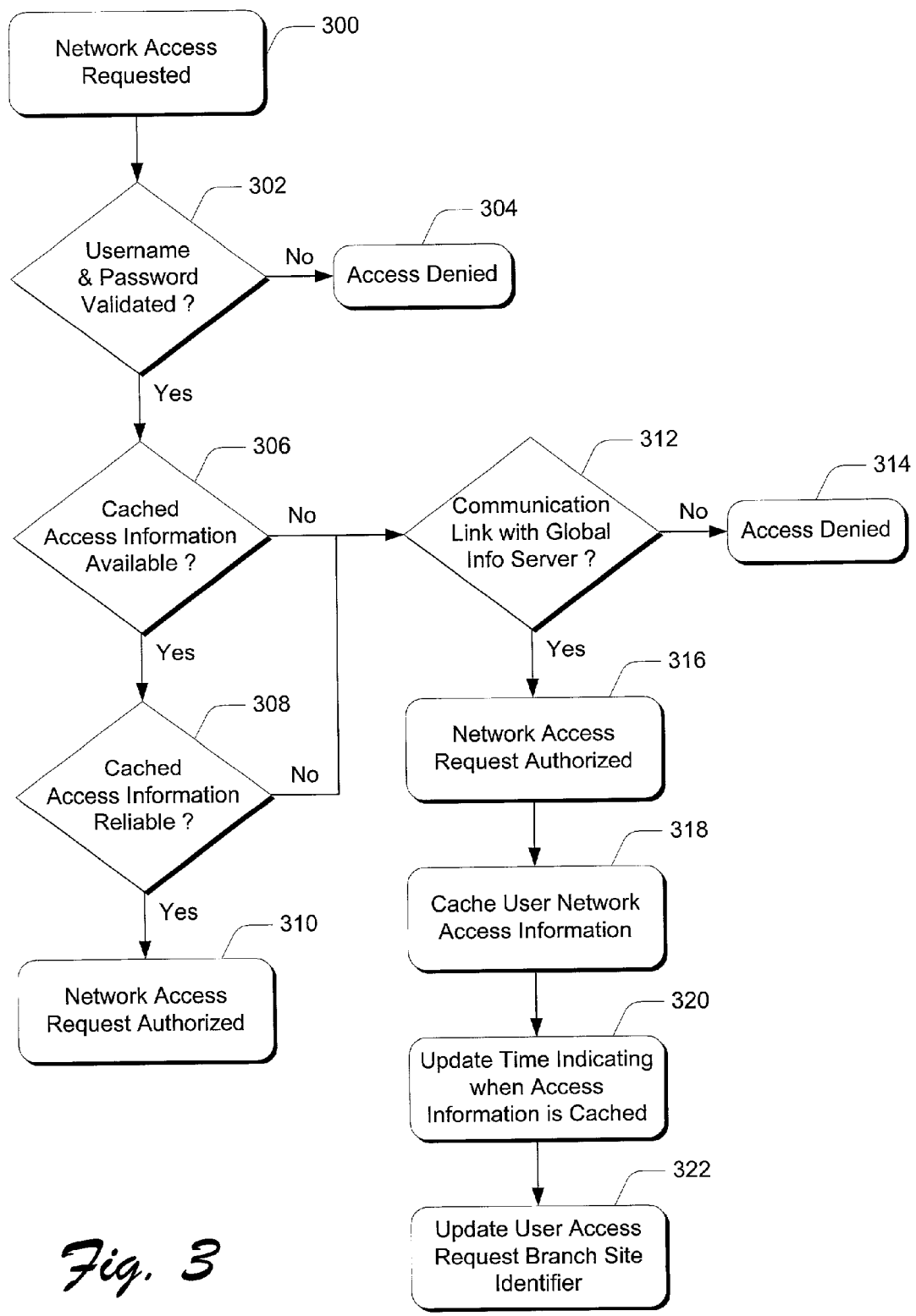
FIG. 3 is a flow diagram of a method for caching user network access information.

FIG. 3 illustrates a method for caching user network access information at a remotely located branch site domain controller and refers to items described in FIGS. 1 and 2 by reference number. The order in which the method is described is not intended to be construed as a limitation. At block 300, a user requests access to a network 200 from a work station 204 connected to a network domain controller 202. At block 302, the domain controller 202 validates the username and password with user object 212 maintained at the domain controller. The user object 212 is associated with the user requesting access to the network 200. If the username and password supplied by the user are not validated (i.e., "no" from block 302), the logon network access request is denied at block 304.

If the username and password supplied by the user are validated (i.e., "yes" from block 302), domain controller 202 validates the user's universal group membership status. The domain controller does so by checking the user object attribute Cached_Membership 250 for cached SIDs (security identifiers) 252 at block 306.

If the associated user object 212 does have cached SIDs 252 (i.e., "yes" from block 306), the domain controller 202 verifies that the Last_Refresh_Time 254 (i.e., update time 256) does not exceed the Staleness parameter 264 at block 308. If the cached SIDs 252 are still reliable (i.e., "yes" from block 308), the domain controller 202 authorizes the user's network access request with the cached SIDs 252 at block 310.

If the user object 212 does not have cached SIDs 252 for the user requesting network access (i.e., "no" from block 306), or if the Last_Refresh_Time 254 exceeds the Staleness parameter 264 (i.e., "no" from block 308), the domain controller 202 attempts to contact the global information server 110 via the communications network 108 at block 312. If the domain controller 202 cannot establish a communications link with the global information server 110 (i.e., "no" from block 312), the logon network access request is denied at block 314. If the domain controller 202 can establish a communications link with the global information server 110 (i.e., "yes" from block 312), the domain controller 202 authorizes the user's network access request with the SIDs 228 stored in the associated user object data structure 214 at the global information server 110 (block 316).

After contacting the global information server 110 to service the user's network access request (blocks 312, 316), the domain controller 202 updates the user object 212 with the user network access information maintained at the global information server directory 208 in the data structure 214. At block 318, the domain controller 202 updates Cached_Membership 250 by caching the SIDs 252 from the SIDs 228 stored in the global information server directory 208. The domain controller 202 also updates the Last_Refresh_Time 254 in user object 212 at block 320.

At block 322, the domain controller 202 updates the Site_Affinity attribute 246 (i.e., the multi-valued data structure 248) in user object 212. This indicates that a user access request is initiated at a particular branch site domain controller. The domain controller 202 updates the Site_Affinity attribute 246 if the multi-valued data structure 248 does not indicate that the networked branch site domain controller 202 is where the user requested network access. The Site_Affinity attribute 246 is also updated by the domain controller 202 if a user performs a password change operation on a user account associated with a user object at domain controller 202.

If the domain controller 202 cannot establish a communications link with the global information server 110 (i.e., "no" from block 312), and the logon network access request is denied at block 314, blocks 318–320 are performed as described above when the domain controller 202 can next establish a communications link with the global information server 110. This is to facilitate a subsequent user access request if the user has tried to logon but failed. The network access information for the user is updated for the next user access request.

Figure 4:
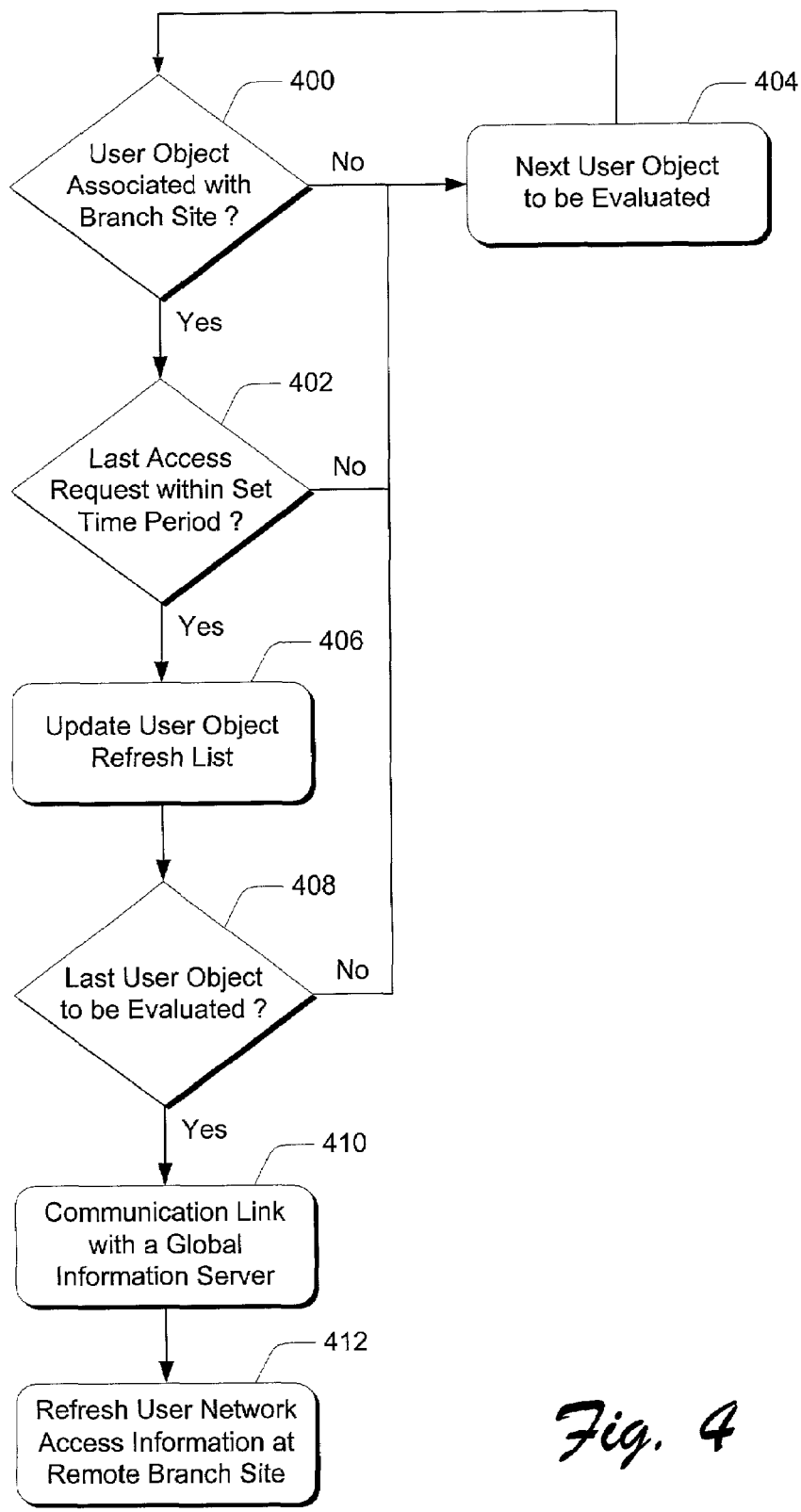
FIG. 4 is a flow diagram of a method for refreshing user network access information.

FIG. 4 illustrates a method to periodically refresh user network access information at a remotely located branch site domain controller and refers to items described in FIGS. 1 and 2 by reference numbers. The order in which the method is described is not intended to be construed as a limitation. The domain controller 202 periodically refreshes the Cached_Membership SIDs 252 for users associated with the domain controller. At block 400, the domain controller 202 identifies those user objects (i.e., users or clients) at the domain controller having an affinity for requesting network access via the domain controller. User objects are identified by the Site Affinity 246 GUID at the domain controller.

If a user is identified as having requested network access at domain controller 202 (i.e., "yes" from block 400), the domain controller checks that the associated Site_Affinity 246 Timestamp does not exceed 2×Half_Life parameter 260 at block 402. If a user is not identified as requesting network access a domain controller 202 (i.e., "no" from block 400), or if a user has not requested network access within a set period of time (i.e., "no" from block 402), another user object maintained at the domain controller 202 is evaluated at block 404 to evaluate if the associated user network access information will be refreshed.

If a user has requested network access within a set time period (i.e., "yes" from block 402), the domain controller 202 updates the user refresh list 262 at block 406. The user objects in the refresh list indicate those users having a site affinity for the domain controller 202, and a Timestamp that has not expired.

At block 408, the domain controller 202 determines if all of the user objects at the domain controller have been evaluated to determine if the associated user network access information will be refreshed. If the domain controller 202 has not evaluated all of the user objects (i.e., "no" from block 408), another user object maintained at the domain controller 202 is evaluated at block 404 to determine if the associated user network access information will be refreshed.

If all of the user objects have been evaluated (i.e., "yes" from block 408), the domain controller 202 establishes a communication link with the global information server 110 via the communications network 108 at block 410. In a network architecture having more than one global information server that maintains a directory of user network access information, a domain controller can refresh the user access information from whichever global information server is available and/or is the most efficient connection by virtue of bandwidth and/or cost. At block 412, the domain controller 202 updates the Cached_Membership SIDs 252 and the Last_Refresh_Time 254 (update time 256) for each user object identified to be updated in the user refresh list 262.

Figure 5:
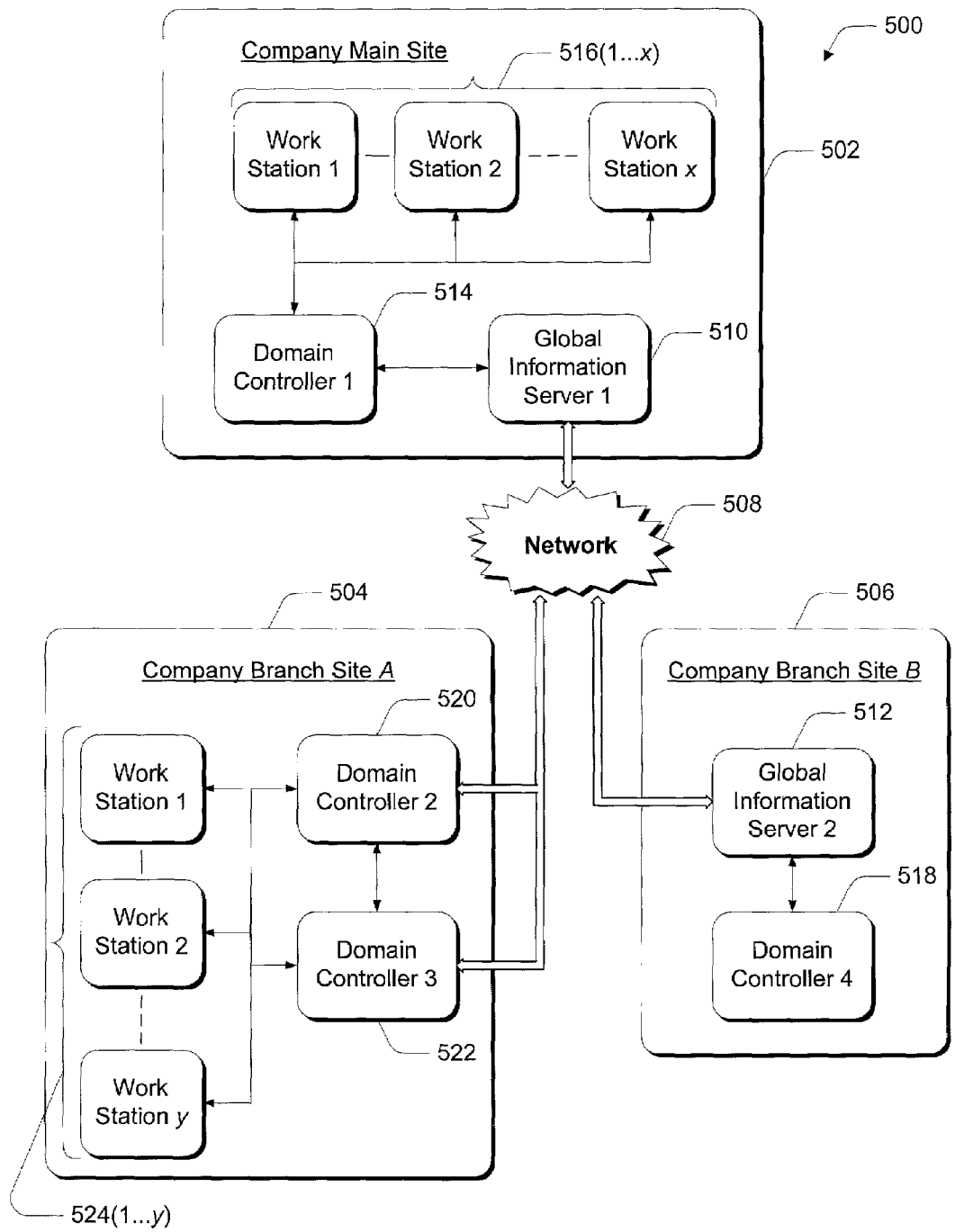
FIG. 5 is a block diagram that illustrates an alternative configuration of the network architecture illustrated in FIG. 1.

FIG. 5 illustrates an alternative configuration of network architecture 100 described in FIG. 1. FIG. 5 shows a network architecture 500 in which a company has a main site 502 and two remotely located company branch sites 504, 506. The main site 502 and the branch sites 504, 506 are interconnected via a communications network 508. The network architecture 500 implements two global information servers. A first global information server 510 is implemented at the main site 502 and a second global information server 512 is implemented at the branch site 506. Each server 510, 512 maintains network-wide information and is communicatively linked within the network 500 via the communications network 508. Although the network architecture 500 is illustrated having only two global information servers 510, 512, the methods and systems described herein are applicable to a network architecture having one, or any number of, global information servers.

The main site 502 and the branch site 506 each implement a network branch site domain controller to locally administrate network access and functions. Main site 502 has a domain controller 514 connected to the global information server 510. The main site 502 also has any number of work stations 516(1 . . . x) connected to the domain controller 514.

The branch site 506 has a domain controller 518 locally connected to the global information server 512. The branch site 506 also has any number of work stations (not shown) connected to the domain controller 518. The branch site 504 has two domain controllers 520, 522 interconnected locally at the branch site 504 and connected to each of the global information servers 510, 512 via the communications network 508. The branch site 504 has any number of work stations 524(1 . . . y) connected to either or both of the domain controllers 520, 522 to facilitate user access to either of the global information servers 510, 512.

Both of the global information servers 510, 512, and each of the four domain controllers 514, 518, 520, 522 function to cache and refresh user network access information as described in reference to the configuration of data structures in a network architecture as shown in FIG. 2, and as described in reference to the methods shown in FIGS. 3 and 4.

Exemplary Computing System and Environment

Figure 6:
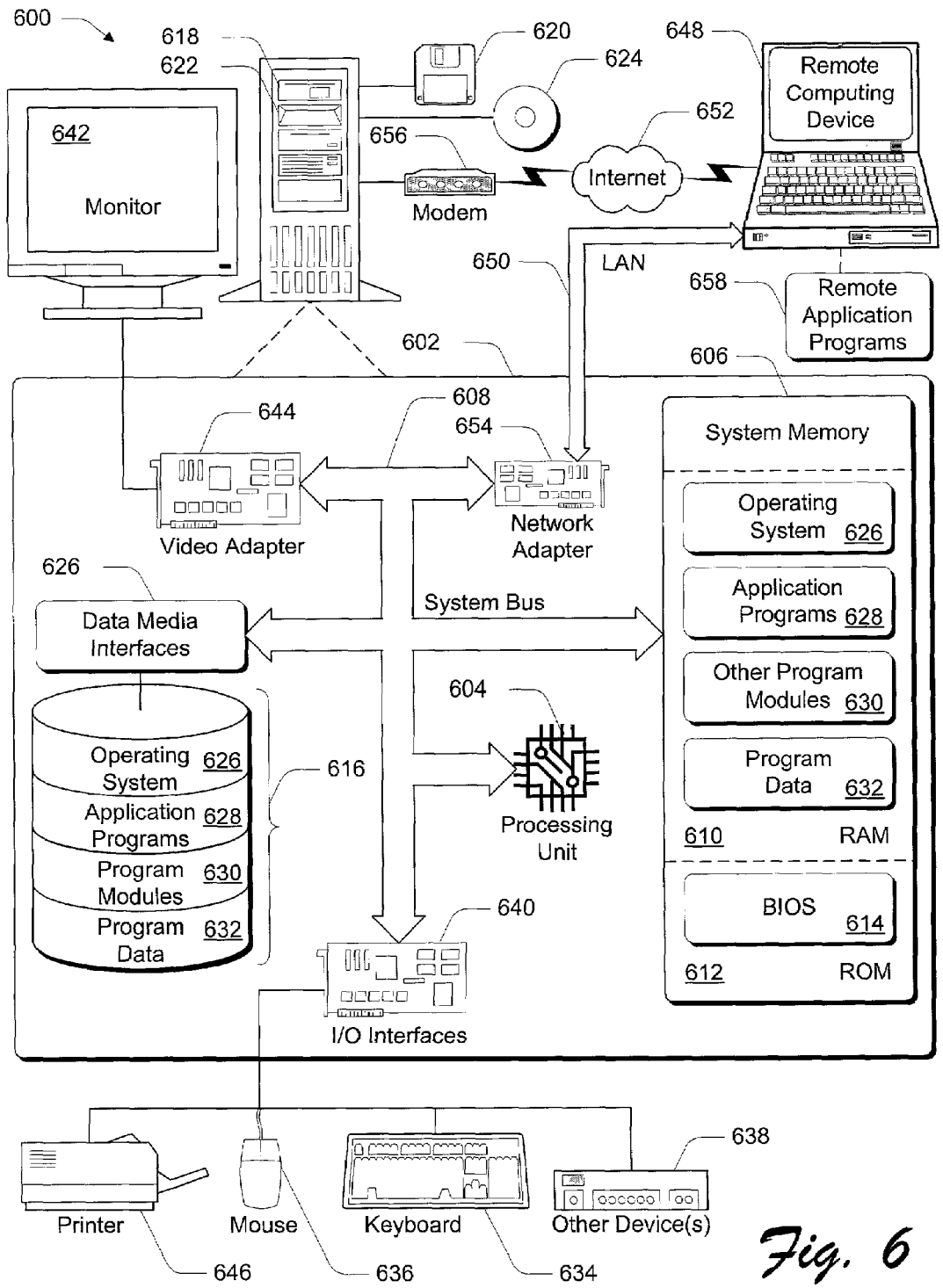
FIG. 6 is a diagram of a computing system and environment that can be utilized to implement the technology described herein.

FIG. 6 illustrates an example of a computing environment 600 within which the computer and network architectures described herein can be either fully or partially implemented. Exemplary computing environment 600 is only one example of a computing system and is not intended to suggest any limitation as to the scope of use or functionality of the network architectures. Neither should the computing environment 600 be interpreted as having any dependency or requirement relating to any one or combination of components illustrated in the exemplary computing environment 600.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Caching user network access information may be described in the general context of computer-executable instructions, such as program modules, being executed by a computer. Generally, program modules include routines, programs, objects, components, data structures, etc. that perform particular tasks or implement particular abstract data types. Caching network access information may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing system in the form of a computer 602. The components of computer 602 can include, by are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 602 typically includes a variety of computer readable media. Such media can be any available media that is accessible by computer 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 can also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by a SCSI interface (not shown).

The disk drives and their associated computer-readable media provide nonvolatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a caching scheme for user network access information.

Computer system 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

Conclusion

Although the systems and methods have been described in language specific to structural features and/or methodological steps, it is to be understood that the technology defined in the appended claims is not necessarily limited to the specific features or steps described. Rather, the specific features and steps are disclosed as preferred forms of implementing the claimed invention.

The invention claimed is:

1. A network system, comprising:
   a network server configured to maintain network access information corresponding to users authorized to access the network system, the network access information comprising identifiers to indicate network group memberships that an individual user is a member of in the network system;
   a domain controller remotely located from the network sewer at a remote network site and communicatively linked with the network server, the domain controller configured to locally administrate access to the network system;
   the domain controller further configured to:
   track individual users that request access to the network system via the domain controller at the remote network site, the domain controller configured to track a user by identifying the remote network site where the user requests the access, recording a time at which the request is made, and monitoring when the network access information is cached for the user that requests the access;
   receive a first network access request from the user and validate the first network access request with the network access information maintained at the network server when the network access information is not cached at the domain controller;
   maintain user objects associated with the individual users that request access to the network system from the domain controller;
   cache the network access information including the user objects; and
   receive a second network access request from the user and validate the second network access request with the network access information cached at the domain controller
   wherein the network server is further configured to replicate a partial copy of the user objects from the domain controller such that the replicated partial copy of the user objects can be associated with individual identifiers to identify the network group memberships for the individual user.

2. A network system as recited in claim 1, wherein the domain controller is further configured to cache the network access information only for the individual users that request access to the network system via the domain controller at the remote network site.

3. A network system as recited in claim 1, wherein the domain controller is further configured to update the network access information at the domain controller for the individual users that request access to the network system via the domain controller at the remote network site.

4. A network system as recited in claim 1, wherein the domain controller is further configured to update the network access information at the domain controller for the individual users that request access to the network system via the domain controller at the remote network site within a defined lime interval.

5. A network system as recited in claim 1, wherein the domain controller is further configured to validate the second network access request with the network access information cached at the domain controller if the second network access request is within a defined lime interval.

6. A network, comprising:
   a global information server configured to maintain network information corresponding to users of the network;
   a remote server communicatively linked with the global information server, the remote server configured to:
   receive a first network access request from a user and validate the first network access request with the network information maintained at the global information server when the network information corresponding to the user is not cached at the remote server;
   cache the network information corresponding to the user at the remote server;
   receive a second network access request from the user and validate the second network access request with the network information cached at the remote server;
   track individual users that request access to the network from the remote server by identifying the remote server where the user requests the access, recording a time at which the request is made, and monitoring when the network information is cached for the user that requests the access; and update the network information including replicating user objects cached at the remote server on the global information server for the individual users that access the network from the remote server.

7. A network as recited in claim 6, wherein the remote server is further configured to update the network information cached at the remote server for the individual users that access the network from the remote server within a defined time interval.

8. A network as recited in claim 6, wherein the remote server is further configured to validate the second network access request with the network information cached at the remote server if the user accessed the network from the remote server within a defined time interval.

9. A network as recited in claim 6, wherein the remote server is further configured to track individual users that request access to the network information cached at the remote server.

10. A network as recited in claim 6, wherein the remote server is further configured to receive a user request to access the network information cached at the remote server and validate the user request if the user accessed the network from the remote server within a defined time interval.

11. A method, comprising:
maintaining network access information at a first network site, the network access information identifying users authorized to access a network and including identifiers to indicate network group memberships that an individual user is a member of in the network system;
validating a first network access request from a user at a second network site with the network access information maintained at the first network site when the network access information identifying the user is not cached at the second network site;
caching the network access information identifying the user at the second network site;
validating a second network access request from the user at the second network site with the network access information cached at the second network site;
tracking individual user requests to access the network from the second network site by identifying the second network site where the user requests the access, recording a time at which the user requests the access, and monitoring when the network access information identifying the user is cached for the user making the request and,
replicating a partial copy of user objects cached at the second network site such that the replicated partial copy of the user objects can be associated with individual identifiers to identify the network group memberships for individual users.

12. A method as recited in claim 11, wherein said caching comprises storing the network access information at the second network site only for the individual users that request access to the network from the second network site.

13. A method as recited in claim 11, further comprising updating the network access information at the second network site for the individual users that periodically request access to the network from the second network site.

14. A method as recited in claim 11, further comprising updating the network access information at the second network site for the individual users that request access to the network from the second network site within a defined time interval.

15. A method as recited in claim 11, wherein said validating the second network access request comprises validating the second network access request with the network access information cached at the second network site if the second network access request is within a defined time interval.

16. Computer readable media comprising computer executable instructions that, when executed, direct a computing system to perform the method of claim 11.

17. A method, comprising:
maintaining network information at a global information server, the network information corresponding to users of the network and including identifiers to indicate network group memberships that an individual user is a member of in the network system;
receiving a first network access request from a user at a remote server communicatively linked with the global information server;
validating the first network access request at the remote server with the network information maintained at the global information server when the network information corresponding to the user is not cached at the remote server;
maintaining, at the remote server, user objects associated with the individual users that request access to the network system from the remote server;
caching the network information corresponding to the user at the remote server;
receiving a second network access request from the user at the remote server;
validating the second network access request at the remote server with the network information cached at the remote server;
tracking, at the global information server, users that request access to the network via the remote server by identifying where the access requests originate and recording a time at which the access requests are made;
updating the network information cached at the remote server with the network information maintained at the global information server for users authorized to access the network from the remote server, and that accessed the remote server within a defined time interval; and,
replicating a partial copy of the user objects from the remote server such that the replicated partial copy of the user objects can be associated with individual identifiers to identify the network group memberships for the individual user.

18. A method as recited in claim 17, wherein said validating the second network access request comprises validating the second network access request with the network information cached at the remote server if the second network access request is received within a defined time interval.

19. A method as recited in claim 17, further comprising:
receiving a user request to access the network information cached at the remote server; and
validating the user request at the remote server.

20. A method as recited in claim 17, further comprising:
receiving a user request to access the network information cached at the remote server; and
validating the user request at the remote server if the user request is received within a defined time interval.

21. A network system, comprising:
a global information server located at a main site on a network and configured to maintain network access information corresponding to users authorized to access the network;
a domain controller located at a remote site on the network and communicatively linked with the global information server, the domain controller configured to periodically cache the network access information from the global information server and to locally administrate network access requests made from a work station locally connected to the domain controller at the remote site, and to maintain a cache of user objects associated with the individual users that request access to the network system from the domain controller; and the global information server further confirmed to replicate a partial copy of the user objects from the remote server such that the replicated partial copy of the user objects such that individual user objects are associated with specific network access information.

* * * * *

UNITED STATES PATENT AND TRADEMARK OFFICE
CERTIFICATE OF CORRECTION

PATENT NO. : 7,085,833 B2  Page 1 of 1
APPLICATION NO. : 09/764956
DATED : August 1, 2006
INVENTOR(S) : Satagopan et al.

It is certified that error appears in the above-identified patent and that said Letters Patent is hereby corrected as shown below:

On the title page, in item (56), under "Other Publications", in column 2, line 10, after "No. 5" insert -- , --.

In column 7, line 47, delete "Site Affinity" and insert -- Site_Affinity --, therefor.

In column 10, line 12, delete "nonvolatile" and insert -- non-volatile --, therefor.

In column 11, line 58, in Claim 1, delete "sewer" and insert -- server --, therefor.

In column 12, line 40, in Claim 4, delete "lime" and insert -- time --, therefor.

In column 12, line 45, in Claim 5, delete "lime" and insert -- time --, therefor.

In column 13, line 46, in Claim 11, after "request" insert -- ; --.

In column 14, line 2, in Claim 15, delete "lime" and insert -- time --, therefor.

In column 16, line 1, in Claim 21, delete "confirmed" and insert -- configured --, therefor.

Signed and Sealed this

Twentieth Day of April, 2010

David J. Kappos
*Director of the United States Patent and Trademark Office*